United States Patent
Wolf et al.

(10) Patent No.: US 12,417,658 B2
(45) Date of Patent: Sep. 16, 2025

(54) VEHICLE FAULT PREDICTION

(71) Applicant: Ford Global Technologies, LLC, Dearborn, MI (US)

(72) Inventors: Chris Wolf, Ann Arbor, MI (US); Nicholas B. Chase, Royal Oak, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 18/046,233

(22) Filed: Oct. 13, 2022

(65) Prior Publication Data

US 2024/0127642 A1  Apr. 18, 2024

(51) Int. Cl.
*G07C 5/08* (2006.01)
*G01C 21/34* (2006.01)

(52) U.S. Cl.
CPC ....... *G07C 5/0816* (2013.01); *G01C 21/3469* (2013.01); *G07C 5/0808* (2013.01); *G07C 5/0841* (2013.01)

(58) Field of Classification Search
CPC .. G07C 5/0816; G07C 5/0808; G07C 5/0841; G07C 5/008; G01C 21/3469; B60W 50/0098; B60W 2050/0031; B60W 2050/021; B60W 2510/244; B60W 2520/10; B60W 2530/10; B60W 2530/209; B60W 2556/10; B60W 2556/45; G05B 23/0213; G06F 18/2415; G06N 7/01
See application file for complete search history.

(56) References Cited

U.S. PATENT DOCUMENTS

| | | | |
|---|---|---|---|
| 2007/0027593 A1* | 2/2007 | Shah | B60W 50/00 702/33 |
| 2018/0257683 A1* | 9/2018 | Govindappa | B61L 27/57 |
| 2019/0172274 A1* | 6/2019 | Duan | F16H 59/00 |
| 2020/0051347 A1* | 2/2020 | Bohl | G06Q 10/04 |
| 2021/0090359 A1* | 3/2021 | Griffiths | B60W 50/0225 |
| 2021/0287459 A1* | 9/2021 | Cella | G07C 5/0808 |
| 2024/0176341 A1* | 5/2024 | McKinley | G07C 5/008 |

FOREIGN PATENT DOCUMENTS

| | | | | |
|---|---|---|---|---|
| CN | 106647724 B | | 12/2017 | |
| CN | 111881980 A | * | 11/2020 | G06K 9/6273 |
| CN | 114091625 B | | 4/2022 | |

OTHER PUBLICATIONS

EPO machine translation of reference CN 111881980 description. (Year: 2020).*

* cited by examiner

*Primary Examiner* — Navid Z. Mehdizadeh
*Assistant Examiner* — Shelley Marie Osterhout
(74) *Attorney, Agent, or Firm* — Christopher Storms; Brooks Kushman P.C.

(57) ABSTRACT

A computer includes a processor and a memory, and the memory stores instructions executable by the processor to receive time-series data from sensors of a vehicle, determine an efficiency of the vehicle, and determine a probability of a fault occurring in the vehicle based on the time-series data and on the efficiency. The efficiency is energy consumption by the vehicle per distance traveled by the vehicle.

16 Claims, 3 Drawing Sheets

VEHICLE FAULT PREDICTION

BACKGROUND

Modern vehicles typically include on-board diagnostics, which are systems to self-diagnose and report issues on board a vehicle. Reporting issues may follow a standard such as On-Board Diagnostics II (OBD-II). The vehicle may output a message indicating an issue through a physical port. The OBD-II standard specifies a 16-pin D-shaped female connector as the port for outputting messages. The message may take the form of a diagnostic trouble code (DTC). According to OBD-II, the format of a DTC is a letter followed by four digits, the combination of which can identify a particular issue with the vehicle, e.g., a fault associated with a vehicle component.

DETAILED DESCRIPTION

Figure 1:
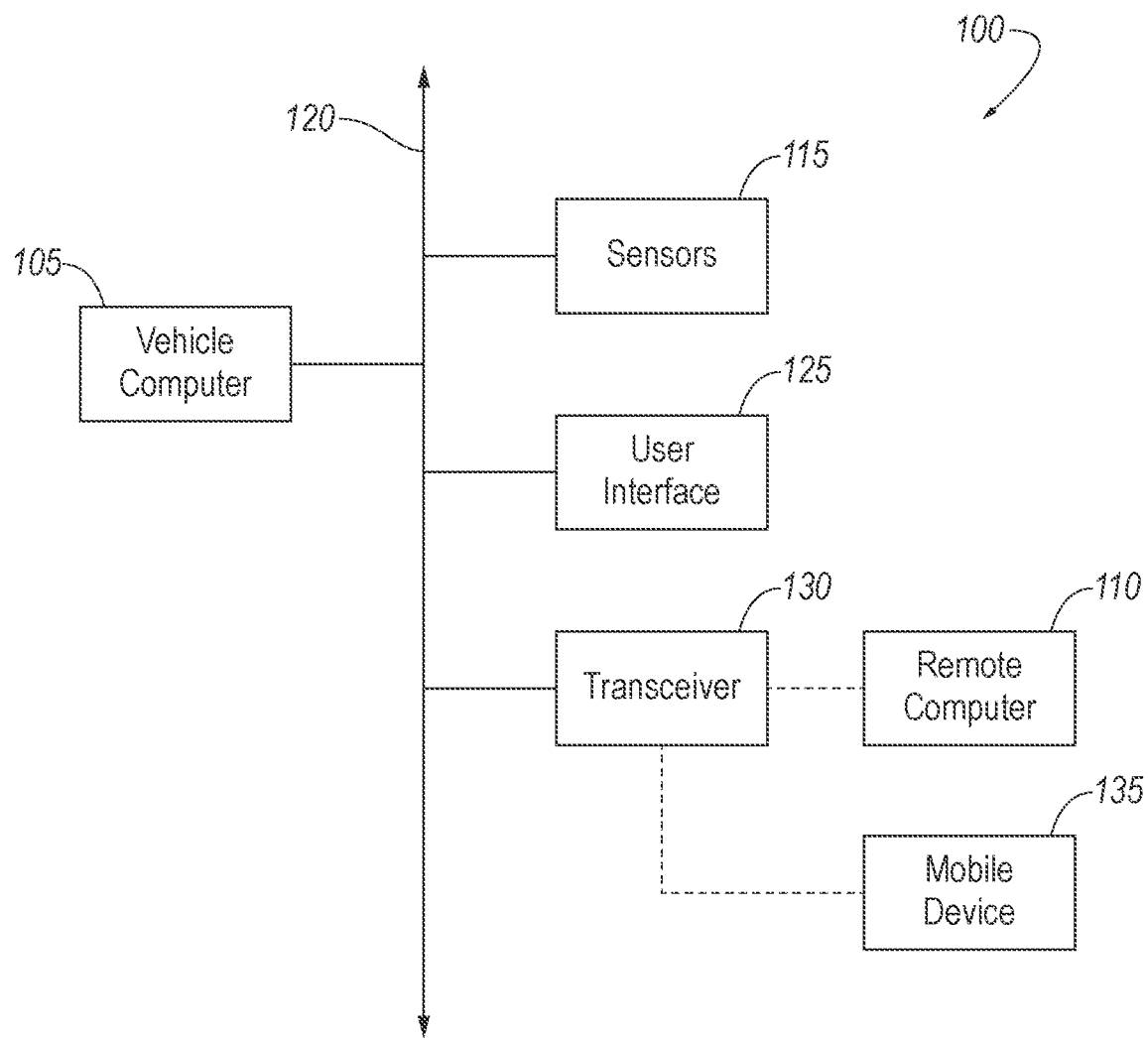
FIG. 1 is a block diagram of an example vehicle.

This disclosure describes techniques for predicting faults on board a vehicle before those faults occur, e.g., before an OBD-II system of the vehicle would otherwise output a diagnostic trouble code. A computer is programmed to receive time-series data from sensors of the vehicle, determine an efficiency of the vehicle, and determine a probability of a fault occurring in the vehicle based on the time-series data and on the efficiency. A measurement of the efficiency of the vehicle is energy consumption by the vehicle per distance traveled by the vehicle. In some circumstances, inefficient operation of the vehicle may indicate an impending fault, permitting the impending fault to be addressed before becoming an actual fault. The time-series data from the sensors may be values that affect the efficiency, e.g., internal temperatures, tire pressures, etc. The use of the time-series data may permit the computer to identify the circumstances in which inefficient operation indicates an impending fault, as well as which fault is impending. A fault or possible fault may thus be identified earlier than it would have been otherwise.

A computer includes a processor and a memory, and the memory stores instructions executable by the processor to receive time-series data from sensors of a vehicle, determine an efficiency of the vehicle, and determine a probability of a fault occurring in the vehicle based on the time-series data and on the efficiency. The efficiency being energy consumption by the vehicle per distance traveled by the vehicle.

In an example, the instructions may further include instructions to output a message in response to the probability exceeding a threshold.

In an example, the instructions may further include instructions to determine a plurality of probabilities including the probability of a plurality of respective faults including the fault occurring in the vehicle. In a further example, the instructions may further include instructions to output a message in response to at least one of the probabilities exceeding a threshold.

In another further example, the memory may store a plurality of thresholds for the respective faults, the thresholds may include at least two different values, and the instructions may further include instructions to output a message in response to at least one of the probabilities exceeding the respective threshold.

In an example, the instructions may further include instructions to determine the probability in response to an indication of a completion of a trip of the vehicle. In a further example, the indication may be one of turning off the vehicle or shifting the vehicle to park.

In another further example, the instructions may further include instructions to determine a trip-level metric either applicable to the trip as a whole or indicating a state of the vehicle at a beginning and the completion of the trip, and determining the probability may be based on the trip-level metric.

In an example, the instructions may further include instructions to determine the probability by executing a machine-learning program, and the time-series data and the efficiency are inputs to the machine-learning program. In a further example, the machine-learning program may include a feature-extraction program, and the time-series data may be an input to the feature-extraction program. In a yet further example, the machine-learning program may include a classification program, and an output of the feature-extraction program may be an input to the classification program. In a still yet further example, the efficiency may be an input directly to the classification program.

In another still yet further example, the instructions may further include instructions to determine a trip-level metric either applicable to a trip of the vehicle as a whole or indicating a state of the vehicle at a beginning and at a completion of the trip, and the trip-level metric may be an input directly to the classification program.

In another further example, the machine-learning program may be trained on ground-truth faults and training data, the training data may include training time-series data and training efficiencies, and the training data may be paired to the ground-truth faults. In a yet further example, the ground-truth faults may be diagnostic trouble codes.

In an example, the time-series data may include a temperature of a vehicle component.

In an example, the time-series data may include a tire pressure of a tire of the vehicle.

In an example, the fault may correspond to a diagnostic trouble code.

In an example, the instructions may further include instructions to at least one of output a message to a screen of the vehicle, transmit the message to a mobile device, or transmit the message to a server remote from the vehicle.

A method includes receiving time-series data from sensors of a vehicle, determining an efficiency of the vehicle, and determining a probability of a fault occurring in the vehicle based on the time-series data and on the efficiency. The efficiency is energy consumption by the vehicle per distance traveled by the vehicle.

With reference to the Figures, wherein like numerals indicate like parts throughout the several views, a vehicle computer 105 or a remote computer 110 includes a processor and a memory, and the memory stores instructions executable by the processor to receive time-series data 205 from sensors 115 of a vehicle 100, determine an efficiency 210 of the vehicle 100, and determine a probability 215 of a fault occurring in the vehicle 100 based on the time-series data 205 and on the efficiency 210. The efficiency 210 is energy consumption by the vehicle 100 per distance traveled by the vehicle 100.

With reference to FIG. 1, the vehicle 100 may be any passenger or commercial automobile such as a car, a truck, a sport utility vehicle, a crossover, a van, a minivan, a taxi, a bus, etc.

The vehicle 100 includes the vehicle computer 105. The vehicle computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 105 can thus include a processor, a memory, etc. The memory of the vehicle computer 105 can include media for storing instructions executable by the processor as well as for electronically storing data and/or databases, and/or the vehicle computer 105 can include structures such as the foregoing by which programming is provided. The vehicle computer 105 can be multiple computers coupled together.

The vehicle computer 105 may transmit and receive data on board the vehicle 100 through a communications network 120 such as a controller area network (CAN) bus, Ethernet, WiFi, Local Interconnect Network (LIN), onboard diagnostics connector (OBD-II), and/or by any other wired or wireless communications network. The vehicle computer 105 may be communicatively coupled to the sensors 115, a user interface 125, a transceiver 130, and other components of the vehicle 100 via the communications network 120.

The sensors 115 may provide data about operation of the vehicle 100, for example, wheel speed, wheel orientation, tire pressure, and engine and transmission data (e.g., temperature, fuel consumption, etc.). The sensors 115 may detect the location and/or orientation of the vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the vehicle 100, such as other vehicles, road lane markings, traffic lights and/or signs, pedestrians, etc. For example, the sensors 115 may include radar sensors, ultrasonic sensors, scanning laser range finders, light detection and ranging (lidar) devices, and image processing sensors such as cameras.

The user interface 125 presents information to and receives information from an occupant of the vehicle 100. The user interface 125 may be located, e.g., on an instrument panel in a passenger cabin of the vehicle 100, or wherever may be readily seen by the occupant. The user interface 125 may include dials, digital readouts, screens, speakers, and so on for providing information to the occupant, e.g., human-machine interface (HMI) elements such as are known. The user interface 125 may include buttons, knobs, keypads, microphone, and so on for receiving information from the occupant.

The transceiver 130 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 130 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, etc. The remote server may be the remote computer 110, a mobile device 135, e.g., associated with the operator or owner of the vehicle 100, etc. The transceiver 130 may be one device or may include a separate transmitter and receiver.

The remote computer 110 is a microprocessor-based computing device, e.g., a generic computing device including a processor and a memory. The memory of the remote computer 110 can include media for storing instructions executable by the processor as well as for electronically storing data and/or databases, and/or the remote computer 110 can include structures such as the foregoing by which programming is provided. The remote computer 110 can be multiple computers coupled together.

The mobile device 135 is a portable computing device such as a mobile phone, e.g., a smartphone, or a tablet. The mobile device 135 is a computing device including a processor and a memory. The mobile device 135 is owned and carried by a person who may be the operator or owner of the vehicle 100.

For the purposes of this disclosure, a "fault" is an issue that detracts from the operation of the vehicle 100. The faults may correspond to respective diagnostic trouble codes, either one-to-one or to groups of related diagnostic trouble codes. A diagnostic trouble code is a sequence of characters identifying a particular type of fault. For example, diagnostic trouble codes under the OBD-II standard are five characters long. The first character is one of four letters: "P" for powertrain, "C" for chassis, "B" for body, and "U" for network. The second character is either 0 (zero) for a generic code or a 1 (one) for a manufacturer-specific code. The third character is a digit identifying a subsystem in which the fault is located. The fourth and fifth characters are a two-digit number serving as an index of the specific fault.

The vehicle computer 105 or remote computer 110 may be programmed to determine one or more probabilities 215 of one or more faults occurring in the vehicle 100 in response to an indication of a completion of a trip of the vehicle 100. For the purposes of this disclosure, a "trip" is defined as the vehicle 100 moving from a particular state in a first location to a particular state in a second location. The first and second locations may be different; i.e., the vehicle 100 has traveled. The states in the two locations may be the same. For example, the state may be that the vehicle 100 is off or that the vehicle 100 is in park. The indication may be an event suggesting that a trip has completed, e.g., turning off the vehicle 100 when the vehicle 100 is on, shifting the vehicle 100 from another gear to park, etc.

Figure 2:
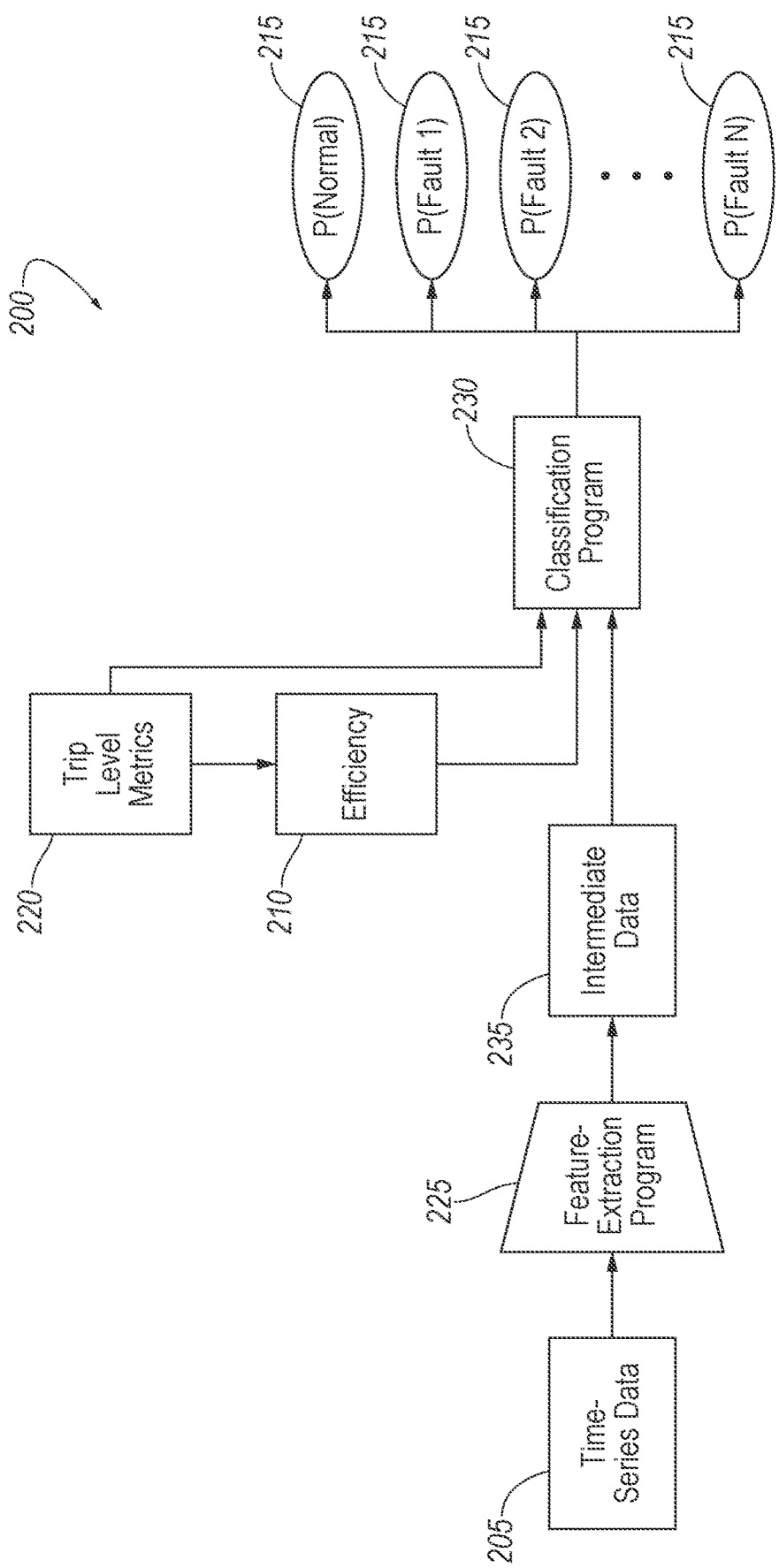
FIG. 2 is a diagram of a machine-learning program trained to predict a fault in the vehicle.

With reference to FIG. 2, the vehicle computer 105 or remote computer 110 may be programmed to receive the time-series data 205 from the sensors 115. As will be generally understood, and for purposes of this disclosure, "time-series data" are values of one or more variables at discrete successive points of time. The time-series data 205 may be chosen that affect the efficiency 210 of the vehicle 100. For example, the time-series data 205 may include one or more temperatures of one or more respective components of the vehicle 100, e.g., a transmission, engine oil, etc. For another example, the time-series data 205 may include one or more tire pressures of one or more respective tires of the vehicle 100. For another example, the time-series data 205 may include variables describing the motion of the vehicle 100, e.g., speed, torque, yaw rate, acceleration, etc. For another example, the time-series data 205 may be environmental data such as ambient temperature, precipitation, etc. The vehicle computer 105 may receive the time-series data 205 over the communications network 120, e.g., in real time. The remote computer 110 may receive the time-series data 205 via the transceiver 130, e.g., in a single transmission in response to the indication of the completion of the trip of the vehicle 100.

The vehicle computer 105 or remote computer 110 may be programmed to determine one or more trip-level metrics 220. A trip-level metric 220 is either applicable to the trip as a whole or indicates a state of the vehicle 100 at a beginning and the completion of the trip. The trip-level metrics 220 may be chosen that affect the efficiency 210 of the vehicle 100. For example, one trip-level metric 220 may be a reduction in charge stored by batteries, e.g., high-voltage batteries, of the vehicle 100 if the vehicle 100 is a battery-electric vehicle. The reduction in charge is the difference between the charge at the beginning of the trip and the charge at the end of the trip. For another example, one trip-level metric 220 may be a volume of fuel consumed during the trip if the vehicle 100 is an internal-combustion vehicle. For another example, one trip-level metric 220 may be a distance traveled during the trip, e.g., as measured by an odometer of the vehicle 100. For another example, one trip-level metric 220 may be a duration of the trip, i.e., a difference between an ending time of the trip and a starting time of the trip. For another example, one trip-level metric 220 may be a change in altitude from the beginning of the trip to the completion of the trip. For another example, one trip-level metric 220 may be a beginning location and ending location of the trip.

The vehicle computer 105 or remote computer 110 may be programmed to determine an efficiency 210 of the vehicle 100. The efficiency 210 is energy consumption by the vehicle 100 per distance traveled by the vehicle 100. For example, the computer may determine the efficiency 210 from the trip-level metrics 220, e.g., the reduction in charge stored by the batteries divided by the distance traveled during the trip.

The vehicle computer 105 or remote computer 110 may be programmed to determine the one or more probabilities 215 of the one or more faults occurring in the vehicle 100 based on the time-series data 205, the efficiency 210, and/or the trip-level metrics 220. Each probability 215 is a likelihood of the respective fault occurring in the vehicle 100, e.g., within a specific time or a within a particular distance traveled by the vehicle 100. A fault occurring in the vehicle 100 may be indicated by the vehicle computer 105 outputting the diagnostic trouble code(s) corresponding to the fault. The probabilities 215 may also include a probability 215 of none of the faults occurring in the vehicle 100.

For example, the vehicle computer 105 or remote computer 110 may be programmed to determine the probabilities 215 by executing an expert system. The expert system may be a deterministic, rule-based system. The rules may be chosen based on, e.g., heuristics used by individuals involved in designing electric vehicles. The inputs to the expert system may include the time-series data 205, the efficiency 210, and/or the trip-level metrics 220.

For another example, the vehicle computer 105 or remote computer 110 may be programmed to determine the probabilities 215 by executing a machine-learning program 200. The inputs to the machine-learning program 200 may include the time-series data 205, the efficiency 210, and/or the trip-level metrics 220. The outputs of the machine-learning program 200 may include at least one probability 215 of a fault occurring in the vehicle 100, e.g., a plurality of probabilities 215 of a plurality of respective faults occurring in the vehicle 100.

The machine-learning program 200 may include a feature-extraction program 225 and a classification program 230. The time-series data 205 may be an input to the feature-extraction program 225. An output of the feature-extraction program 225, which will be referred to as intermediate data 235, may be an input directly to the classification program 230. The efficiency 210 and the one or more trip-level metrics 220 may also be inputs directly to the classification program 230. The probabilities 215 may be outputs of the classification program 230.

The feature-extraction program 225 may be programmed to identify features in the time-series data 205 and output the features as the intermediate data 235. For the purposes of this disclosure, a "feature" of the time-series data 205 is a piece of information about the content of the time-series data 205, specifically about whether a certain range of the time-series data 205 has certain properties, e.g., a spike, a constant value, a repeating periodic pattern, etc. The intermediate data 235 may have a reduced dimensionality compared to the time-series data 205. For example, the feature-extraction program 225 may be a convolutional neural network. The convolutional neural network may include, e.g., convolutional layers to find features within time windows over the time-series data 205, attention layers to find features with dependencies across larger time windows, recurrent layers to find features with dependencies in different time windows, etc. For another example, the feature-extraction program 225 may be an encoder. The encoder may be or include an artificial neural network such as a residual neural network (ResNet). The encoder may include a sequence of layers and may reduce a dimensionality of the data from one layer to the next layer. The output of the final layer, i.e., the intermediate data 235, may be a latent vector.

The classification program 230 may be programmed to receive the efficiency 210, the trip-level metrics 220, and the intermediate data 235 as inputs and to classify the situation defined by the inputs as one of the faults or as no fault. Each probability 215 outputted by the classification program 230 represents a respective strength of the classification of the situation as the respective fault or no fault. For example, the classification may be a support vector machine. For another example, the classification program 230 may be an ensemble model with a plurality of "weak learners," e.g., logistic regression, decision trees, etc. For another example, the classification program 230 may be a naïve Bayes classifier.

The machine-learning program 200 may be trained on ground-truth faults and training data. The training data may include training time-series data and training efficiencies. The training data are paired to the ground-truth faults. The machine-learning program 200 may be trained to replicate the ground-truth faults when given the training data as inputs. The ground-truth faults may be diagnostic trouble codes, e.g., the diagnostic trouble codes corresponding to the ground-truth faults as described above. The ground-truth faults and training data may be historical data gathered from vehicles.

The machine-learning program 200 may be trained using any suitable method for the type of machine learning chosen. For example, the feature-extraction program 225 may be trained using stochastic gradient descent and backpropagation. For another example, if the classification program 230 is an ensemble model, the classification program 230 may be trained using bagging (e.g., Random Forest), gradient boosting (e.g., boosted decision trees, boosted logistic regression), etc.

The memory of the vehicle computer 105 or remote computer 110 may store a plurality of thresholds for the respective faults. The thresholds may include at least two different values, e.g., a unique value for each fault. The thresholds may be chosen based on calibrating a risk of false positives versus a consequence of the fault.

The vehicle computer 105 or remote computer 110 may be programmed to actuate a component of the vehicle 100 in response to a probability 215 exceeding a threshold, e.g., at least one of the probabilities 215 exceeding the respective threshold. For example, actuating the component may include outputting a message. The message may indicate the fault(s) for which the respective probability 215 exceeds the respective threshold, e.g., by including the corresponding diagnostic trouble code(s). For example, actuating the component may include at least one of instructing the user interface 125 to output the message to a screen of the vehicle 100, transmitting the message to the mobile device 135, e.g., via the transceiver 130, or transmitting the message to a server remote from the vehicle 100, e.g., via the transceiver 130 to the remote computer 110. The server may be, e.g., associated with a service center or fleet operator of the vehicle 100. An operator of the vehicle 100 or a technician may thus be alerted to the possibility of the fault occurring in the vehicle 100 and may have the opportunity to preemptively address the fault, e.g., by scheduling a repair, creating a repair plan, ordering parts, etc.

For another example, actuating the component may include modifying operation of a propulsion system of the vehicle 100. For example, the vehicle computer 105 may limit the acceleration, speed, and/or revolutions per minute (RPMs) of the vehicle 100 to maximum values. For another example, the vehicle computer 105 may switch the vehicle 100 to a different driving mode. A driving mode can specify power maps defining throttle response, suspensions stiffness, steering feel, traction control, etc. The vehicle computer 105 may switch to a driving mode that is less stressful on the vehicle 100, e.g., from a sport mode or comfort mode to an eco mode. For another example, for a hybrid or battery-electric vehicle 100, the vehicle computer 105 may turn off an electric motor associated with the probability 215 that exceeded the threshold, leaving an internal-combustion engine or another electric motor operating to accelerate the vehicle 100.

Figure 3:
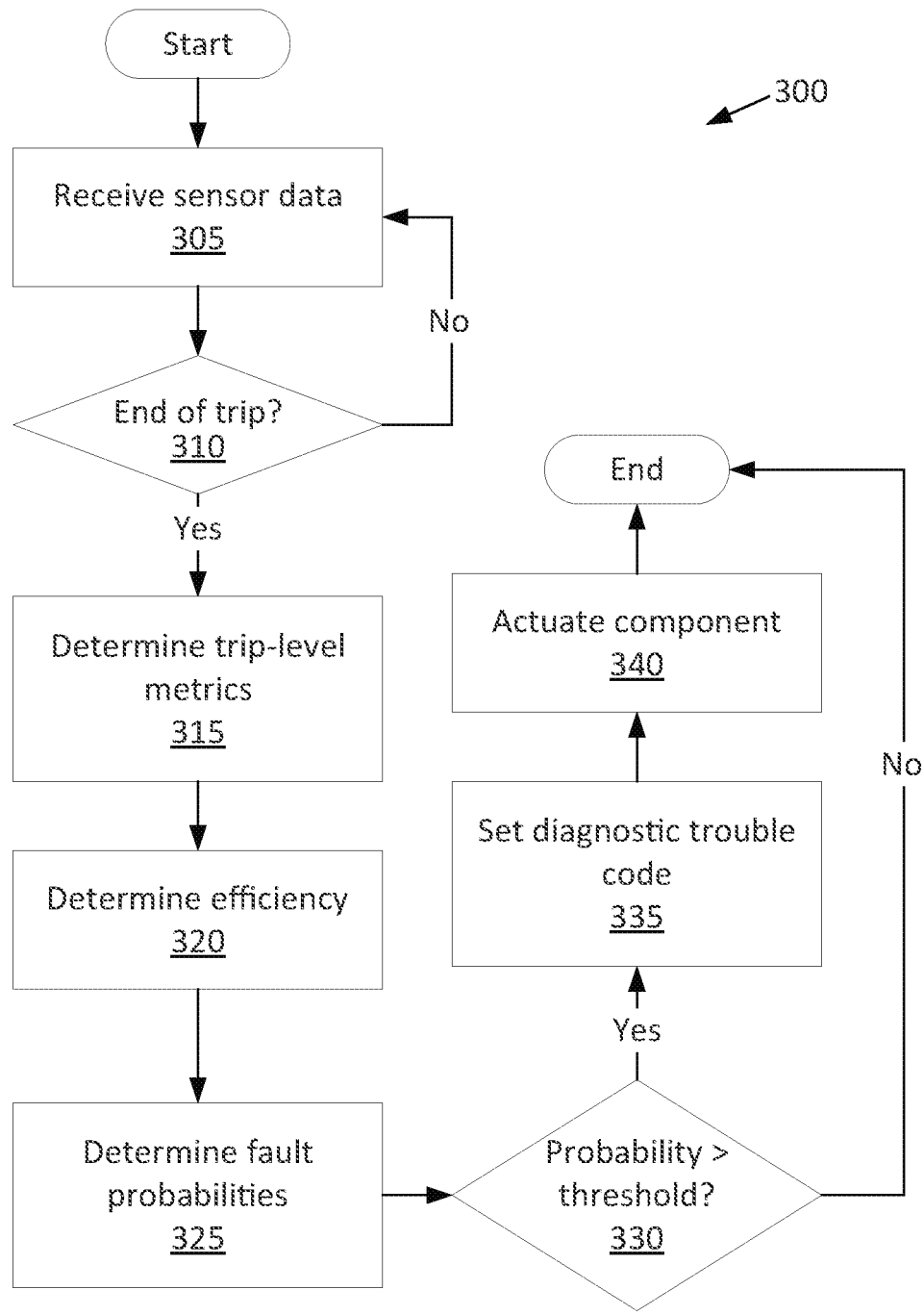
FIG. 3 is a process flow diagram of an example process for predicting the fault in the vehicle.

FIG. 3 is a process flow diagram illustrating an example process 300 for predicting the faults in the vehicle 100. The memory of the vehicle computer 105 and/or remote computer 110 stores executable instructions for performing the steps of the process 300 and/or programming can be implemented in structures such as mentioned above. The process 300 may be performed entirely on the vehicle computer 105 or the remote computer 110 (except as described), or the vehicle computer 105 may begin performing the process 300 and transmit data partway through the process 300 to the remote computer 110 for the remote computer 110 to complete the process 300. As a general overview of the process 300, the vehicle computer 105 receives the time-series data 205 in real time. In response to an indication of a completion of a trip of the vehicle 100, the vehicle computer 105 or the remote computer 110 determines the trip-level metrics 220, determines the efficiency 210, and determines the probabilities 215. In response to at least one of the probabilities 215 exceeding the respective threshold, the vehicle computer 105 or remote computer 110 sets the diagnostic trouble code and actuates a component.

The process 300 begins in a block 305, in which the vehicle computer 105 receives the time-series data 205 from the sensors 115 over the communications network 120, e.g., in real time, as described above.

Next, in a decision block 310, the vehicle computer 105 and/or remote computer 110 determines whether there is an indication of a completion of a trip of the vehicle 100. The vehicle computer 105 determines whether the indication is present as described above. The remote computer 110 may determine whether the indication is present based on whether the remote computer 110 has received a message from the vehicle computer 105 via the transceiver 130 indicating that the trip is complete. The message may also include the time-series data 205 collected in the block 305, so the remote computer 110 thereby receives the time-series data 205. The message may also include the data necessary for determining the trip-level metrics 220 and/or the efficiency 210. In response to the indication of the completion of the trip, the process 300 proceeds to a block 315. Otherwise, the process 300 returns to the block 305 for the vehicle computer 105 to continue receiving new time-series data 205.

In the block 315, the vehicle computer 105 or remote computer 110 determines the trip-level metrics 220, as described above.

Next, in a block 320, the vehicle computer 105 or remote computer 110 determines the efficiency 210 of the vehicle 100, as described above.

Next, in a block 325, the vehicle computer 105 or remote computer 110 determines the probabilities 215 of the faults and of no fault based on the time-series data 205 from the block 305, the trip-level metrics 220 from the block 315, and the efficiency 210 from the block 320, as described above.

Next, in a decision block 330, the vehicle computer 105 or remote computer 110 determines whether at least one of the probabilities 215 determined in the block 325 exceeds the respective threshold, as described above. If none of the probabilities 215 exceed the respective thresholds, the process 300 ends. In response to at least one of the probabilities 215 exceeding the respective threshold, the process 300 proceeds to a block 335.

In the block 335, the vehicle computer 105 or remote computer 110 sets the diagnostic trouble code(s) corresponding to the fault. The vehicle computer 105 may set a value in memory for the diagnostic trouble code(s) corresponding to the fault. The remote computer 110 may transmit an instruction to the vehicle computer 105 via the transceiver 130 to set the value in memory for the diagnostic trouble code(s) corresponding to the fault.

Next, in a block 340, the vehicle computer 105 or the remote computer 110 actuates a component, e.g., by outputting a message, as described above. After the block 340, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive time-series data from sensors of a vehicle;
   determine an efficiency of the vehicle, the efficiency being energy consumption by the vehicle per distance traveled by the vehicle;
   in response to an indication of a completion of a trip of the vehicle, determine a plurality of probabilities of a plurality of respective faults occurring in the vehicle based on the time-series data and on the efficiency, the memory storing a plurality of thresholds for the respective faults, the thresholds having different values dependent on respective types of the respective faults;
   modify operation of a propulsion system of the vehicle based on the probability of the fault; and
   output a message in response to at least one of the probabilities exceeding the respective threshold.

2. The computer of claim 1, wherein the indication is one of turning off the vehicle or shifting the vehicle to park.

3. The computer of claim 1, wherein the instructions further include instructions to determine a trip-level metric applicable only to the single trip as a whole, and determining the probabilities is based on the trip-level metric.

4. The computer of claim 1, wherein the instructions further include instructions to determine the probabilities by executing a machine-learning program, and the time-series data and the efficiency are inputs to the machine-learning program.

5. The computer of claim 4, wherein the machine-learning program includes a feature-extraction program, and the time-series data is an input to the feature-extraction program.

6. The computer of claim 5, wherein the machine-learning program includes a classification program, and an output of the feature-extraction program is an input to the classification program.

7. The computer of claim 6, wherein the efficiency is an input directly to the classification program.

8. The computer of claim 6, wherein the instructions further include instructions to determine a trip-level metric either applicable only to the single trip of the vehicle as a whole or indicating a difference between a state of the vehicle at a beginning of the trip and at the completion of the same trip, and the trip-level metric is an input directly to the classification program.

9. The computer of claim 4, wherein the machine-learning program is trained on ground-truth faults and training data, the training data including training time-series data and training efficiencies, the training data being paired to the ground-truth faults.

10. The computer of claim 9, wherein the ground-truth faults are diagnostic trouble codes.

11. The computer of claim 1, wherein the time-series data includes a temperature of a vehicle component.

12. The computer of claim 1, wherein the time-series data includes a tire pressure of a tire of the vehicle.

13. The computer of claim 1, wherein the types of the faults correspond to respective diagnostic trouble codes.

14. The computer of claim 1, wherein the instructions to output the message include instructions to at least one of output the message to a screen of the vehicle, transmit the message to a mobile device, or transmit the message to a server remote from the vehicle.

15. The computer of claim 1, wherein the instructions further include instructions to determine a trip-level metric indicating a difference between a state of the vehicle at a beginning of the trip and the completion of the same trip, and determining the probabilities is based on the trip-level metric.

16. A method comprising:
receiving time-series data from sensors of a vehicle;
determining an efficiency of the vehicle, the efficiency being energy consumption by the vehicle per distance traveled by the vehicle;
in response to an indication of a completion of a trip of the vehicle, determining a plurality of probabilities of a plurality of respective faults occurring in the vehicle based on the time-series data and on the efficiency, the memory storing a plurality of thresholds for the respective faults, the thresholds having different values dependent on respective types of the respective faults;
modifying operation of a propulsion system of the vehicle based on the probability of the fault; and
outputting a message in response to at least one of the probabilities exceeding the respective threshold.

* * * * *